United States Patent [19]

Ejiri

[11] Patent Number: 4,524,454
[45] Date of Patent: Jun. 18, 1985

[54] METHOD OF ASSIGNING DIRECTION CODE TO BOUNDARY PICTURE ELEMENT IN CHARACTER RECOGNITION SYSTEM

[75] Inventor: Koichi Ejiri, Narashino, Japan

[73] Assignee: Ricoh Company, Ltd., Tokyo, Japan

[21] Appl. No.: 417,962

[22] Filed: Sep. 14, 1982

[30] Foreign Application Priority Data

Sep. 22, 1981 [JP] Japan ................................ 56-149822

[51] Int. Cl.³ .............................................. G06K 9/48
[52] U.S. Cl. ..................................................... 382/21
[58] Field of Search .................... 382/21; 358/260, 263

[56] References Cited

U.S. PATENT DOCUMENTS 3,609,685 9/1971 Deutsch ................................ 382/21

OTHER PUBLICATIONS

Freeman, "Computer Processing of Line-Drawing Images", 1974, pp. 58–99.

Primary Examiner—Leo H. Boudreau
Assistant Examiner—Michael M. Murray
Attorney, Agent, or Firm—David G. Alexander

[57] ABSTRACT

A method applicable to a character recognition system is disclosed which assigns direction codes to a number of boundary picture elements contained in a two-level character pattern. The direction of connectivity of a boundary picture element observed is fractionized to minimize the error due to the quantization of the direction. The direction codes are converted into those which correspond to connectivity directions which should be finally grasped. Such direction codes allow strokes to be extracted quite faithfully to the original character pattern.

5 Claims, 53 Drawing Figures

*Fig. 13g*        *Fig. 13h*
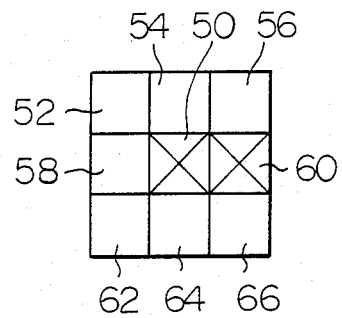 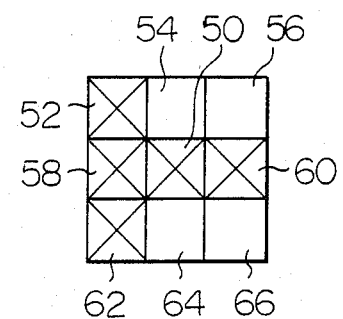
*Fig. 13i*
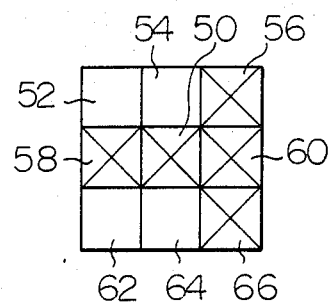
*Fig. 14a*        *Fig. 14b*
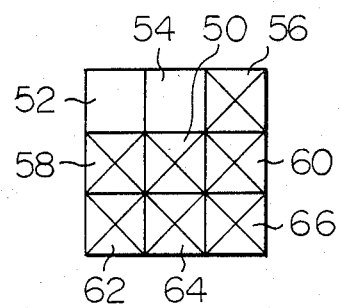 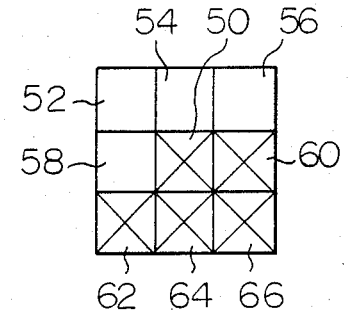

108  104  106

110

104

METHOD OF ASSIGNING DIRECTION CODE TO BOUNDARY PICTURE ELEMENT IN CHARACTER RECOGNITION SYSTEM

BACKGROUND OF THE INVENTION

The present invention generally relates to character recognition systems which recognize, employing a computer or the like, various image information such as hand- or machine-printed characters, marks, numerals and special symbols (hereafter represented by characters for simplicity). More particularly, the present invention relates to a method of assigning direction codes to boundary picture elements which is applicable to such a system to extract a given group of picture elements as strokes from a character pattern which is in the form of a congregation of two-level picture element data.

Various methods have heretofore been proposed for the recognition of characters. In one of such methods, a given group of picture elements are extracted as strokes out of a character pattern or congregation of two-level picture element data and the resulting strokes are used as characteristic parameter for character recognition. This method may be carried out by detecting end points and intersecting points of lines contained in a character, extracting as strokes the segments between the intersecting points, those between the intersecting points and the end points and those between the end points, and recognizing the character on the basis of the respective strokes.

Meanwhile, there have also been proposed various methods for so extracting strokes from character patterns. In one method which appears particularly effective, attention is given to a certain boundary picture element contained in a character pattern, that is, a black picture element which forms the character together with numerous other black picture elements and is neighbored by a white picture element in the up-down or right-left direction. The direction of connectivity of the specific black picture element on the character pattern is identified to assign to the boundary picture element (black picture element) a direction code corresponding to the specific direction of connectivity. Such a procedure is repeated for each of all the boundary picture elements. Then, the character pattern is scanned in different directions for the respective direction codes in order to check the connectivity of the direction codes, so that the congregation of picture elements with interconnecting common direction codes is extracted as a stroke.

A problem has existed in such a prior art method in that, when direction codes are assigned to boundary picture elements of a two-level image provided by sampling, for example, a slanted or curved line on a character pattern, different direction codes appear in undesirable zig-zag fashion at every other or more picture elements.

SUMMARY OF THE INVENTION

A direction code assigning method for boundary picture elements in a character pattern recognition system embodying the present invention includes a step of discriminating the direction of connectivity of each boundary picture element with respect to a plurality of primary directions and a plurality of secondary directions, which individually neighbor the primary directions. Direction codes corresponding to the discriminated directions of connectivity are assigned to the respective boundary picture elements. Out of all the boundary picture elements assigned with direction codes corresponding to the secondary directions, those boundary picture elements adjacent to the boundary picture elements provided with direction codes corresponding to the primary directions are selected. The direction codes assigned to the selected boundary picture elements are converted into the direction codes of the adjacent boundary picture elements which correspond to the primary directions.

In accordance with the present invention, a method applicable to a character recognition system is disclosed which assigns direction codes to a number of boundary picture elements contained in a two-level character pattern. The direction of connectivity of a boundary picture element observed is fractionized to minimize the error due to the quantization of the direction. The direction codes are converted into those which correspond to connectivity directions which should be finally grasped. Such direction codes allow strokes to be extracted quite faithfully to the original character pattern.

It is an object of the present invention to provide a method of assigning direction codes to boundary picture elements which is used in a character recognition system to extract a given group of picture elements as strokes out of a two-level character pattern and, more particularly, a direction code assigning method for boundary picture elements which minimizes influence of quantization of picture elements.

It is another object of the present invention to provide a generally improved method of assigning direction codes to boundary picture elements in a character recognition system.

Other objects, together with the foregoing, are attained in the embodiments described in the following description and illustrated in the accompanying drawings.

BRIEF DESCRIPTION OF THE DRAWING

FIGS. 13a–13i are diagrams showing character patterns corresponding to direction code "0" indicated in FIG. 12;

FIGS. 14a–14k are diagrams showing character patterns corresponding to direction code "1" indicated in FIG. 12;

DESCRIPTION OF THE PREFERRED EMBODIMENT

While the method of assigning direction codes to boundary picture elements in a character recognition system of the present invention is susceptible of numerous physical embodiments, depending upon the environment and requirements of use, a substantial number of the herein shown and described embodiment have been made, tested and used, and all have performed in an eminently satisfactory manner.

To facilitate understanding the invention, a brief reference will be made to a prior art direction code assigning method, depicted in FIGS. 1 to 10a and 10b.

Figure 1:
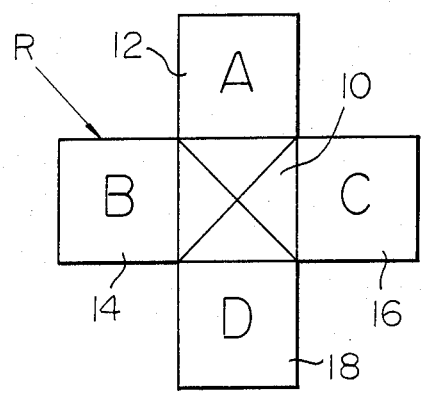
FIG. 1 is a diagram of a discrimination frame or region for determining a direction code and illustrating a prior art method of assigning direction codes to boundary picture elements in a character recognition system.
Figure 2:
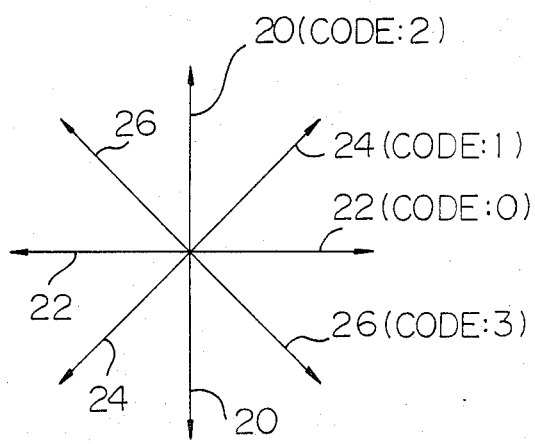
FIG. 2 is a diagram showing directions to which direction codes correspond in accordance with the prior art method.
Figure 3A:
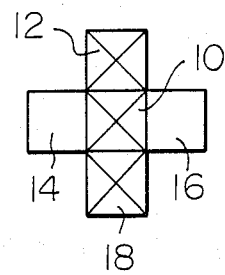
FIGS. 3a-3c are diagrams showing character patterns corresponding to direction code "2" indicated in FIG. 2.
Figure 3B:
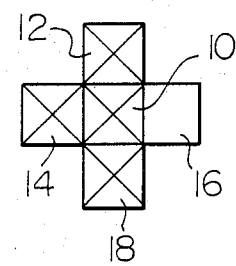
Figure 3C:
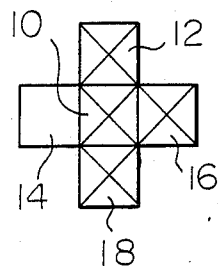
Figure 4A:
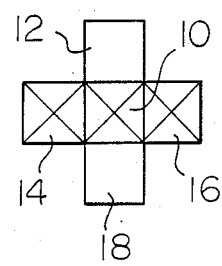
FIGS. 4a-4c are diagrams showing character patterns corresponding to direction code "0" indicated in FIG. 2.
Figure 4B:
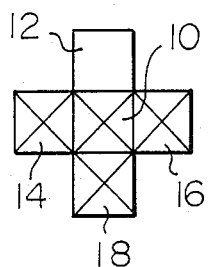
Figure 4C:
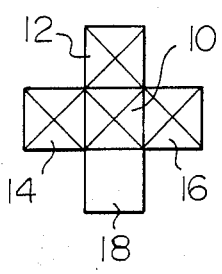
Figure 5:
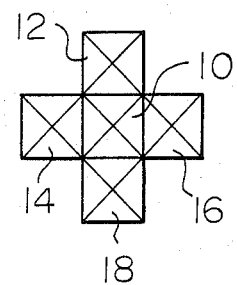
FIG. 5 is a diagram showing a character pattern to which no direction code is assigned.
Figure 6A:
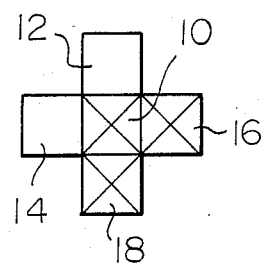
FIGS. 6a-6d are diagrams showing character patterns which correspond to direction code "1" or "3" indicated in FIG. 2.
Figure 6B:
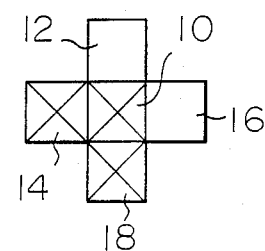
Figure 6C:
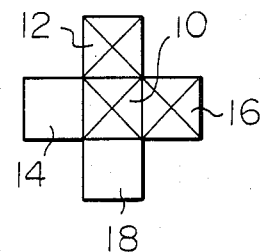
Figure 6D:
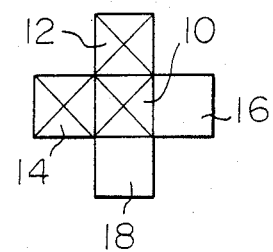

As shown in FIG. 1, a frame or region R has a boundary picture element 10 to be observed, picture elements 12 and 14 positioned above and below the picture element 10, and picture elements 16 and 18 positioned to the right and left of the picture element 10. The region R will hereunder be referred to as "discrimination region". The picture element 12 will be represented by binary "0" level when it is white and by binary "1" level when it is black, and it is indicated by the reference character A; A=1 if the picture element 12 is black. Likewise, the picture element 14 is designated by the reference character B, the picture element 16 by the reference character C and the picture element 18 by the reference character D. In the drawing, each picture element marked "x" should be understood to be black. The boundary picture element 10 is assumed to have connectivity in four different directions 20, 22, 24 and 26 as shown in FIG. 2 and which will be termed "primary directions" herein. The primary directions 20, 22, 24 and 26 are designated by codes "2", "0", "1" and "3", respectively.

A direction code to be assigned to the boundary picture element 10 will be determined in the following manner from the character pattern in the discrimination region R shown in FIG. 1. When the character pattern in the discrimination region R corresponds to any one of the character patterns indicated in FIGS. 3a–3c, the boundary picture element 10 is considered to belong to the stroke in the primary direction 20 and assigned with direction code "2". In the character patterns shown in FIGS. 3a–3c, the product of A and D previously mentioned is "1", $A \times D = 1$, and the product of B and C is "0", $B \times C = 0$. Where the character pattern in the discrimination region R corresponds to any one of the character patterns shown in FIGS. 4a–4c, the boundary picture element 10 is determined to belong to the stroke in the primary direction 22 and assigned with direction code "0". In these character patterns of FIGS. 4a–4c, the product of A and D is "0", $A \times D = 0$, while the product of B and C is "1", $B \times C = 1$. Meanwhile, no direction code is assigned to the character pattern in the discrimination region R when it corresponds to the character pattern depicted in FIG. 5, the picture element observed being a non-boundary picture element. In the character pattern of FIG. 5, the product of A and D is "1", $A \times D = 1$, while the product of B and C is "1", $B \times C = 1$. Furthermore, if the character pattern in the discrimination region R corresponds to the character pattern indicated in any one of FIGS. 6a–6d, the boundary picture element 10 is determined as belonging to the stroke in the primary direction 24 or 26 and provided with direction code "1" or "3". In the character patterns of FIGS. 6a–6d, the product of A and D is "0", $A \times D = 0$, the product of B and C is "0", $B \times C = 0$, and the sum of A, B, C and D is "2", $A + B + C + D = 2$. It will be seen that the character patterns shown in FIGS. 6a and 6d belong to the stroke in the primary direction 24 and those shown in FIGS. 6b and 6c to the stroke in the primary direction 26.

Figure 7:
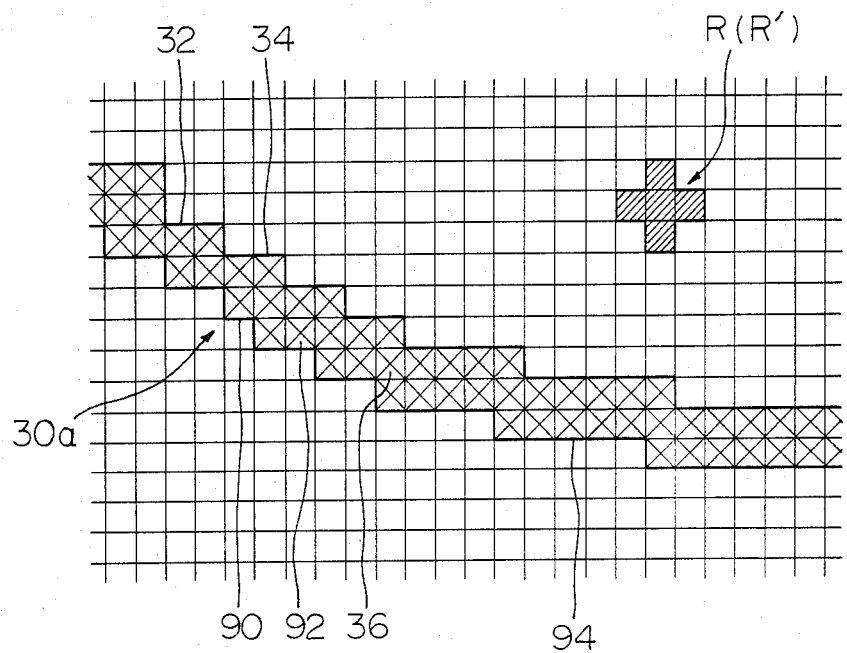
FIG. 7 is a diagram showing an exemplary character pattern.

Using such a prior art method, a procedure for assigning direction codes to respective boundary picture elements of a character pattern will be described. FIG. 7 shows an exemplary character pattern 30a which is a tail 30 of alphabet Q indicated in FIG. 8. In FIG. 7, the hatched frame represents the discrimination region R. Assigning direction codes to the respective boundary picture elements of the character pattern 30a results the code pattern shown in FIG. 9. For example, the discrimination region R concerned with the black picture element 32 corresponds in character pattern to FIG. 4b and, accordingly, the black picture element 32 is provided with direction code "0". Likewise, the discrimination region R concerned with the black picture element 34 corresponds in character pattern to FIG. 6b and provided with direction code "3". The black picture element 36, on the other hand, has a discrimination region R which corresponds in character pattern to FIG. 5 and is provided with no direction code. In this manner, the direction codes are assigned to the various boundary picture elements contained in the character pattern 30a.

Figure 8:
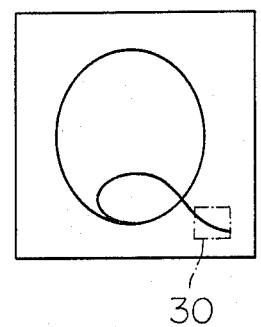
FIG. 8 is a diagram showing a character which is partly formed by the character pattern of FIG. 7.
Figure 9:
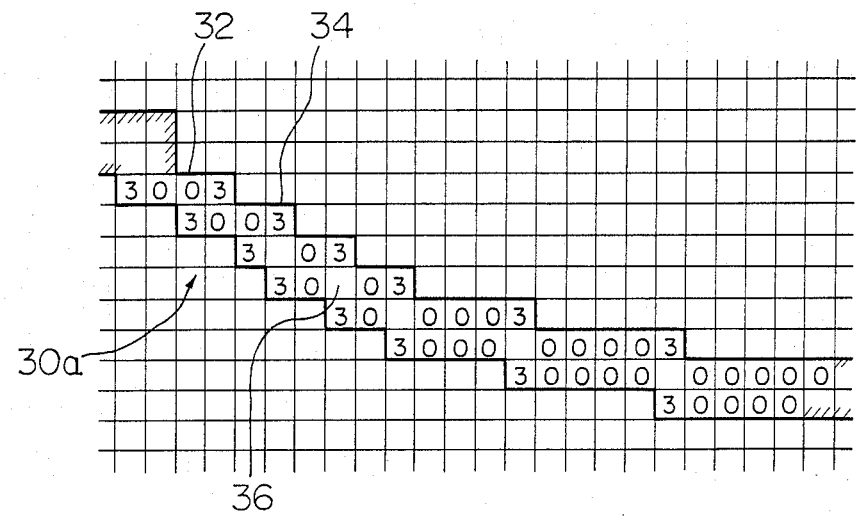
FIG. 9 is a diagram showing direction codes assigned to the boundary picture elements contained in the character pattern of FIG. 7.
Figure 10A:
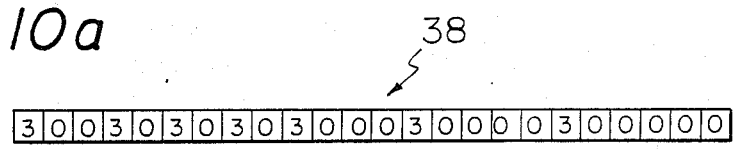
FIGS. 10a and 10b are diagrams demonstrating a procedure for evaluating the direction codes shown in FIG. 9.
Figure 10B:
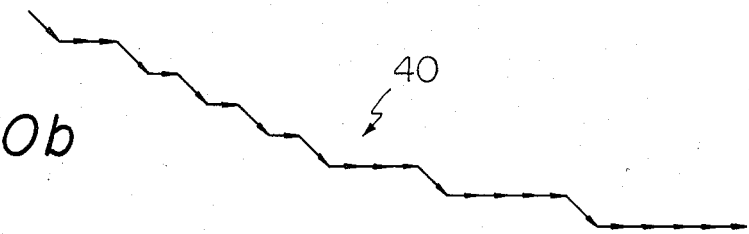
Figure 21A:
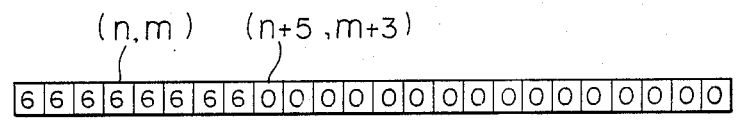
FIGS. 21a and 21b are diagrams corresponding to FIGS. 10a and 10b but illustrating a method of evaluating the direction codes shown in FIG. 20.
Figure 21B:
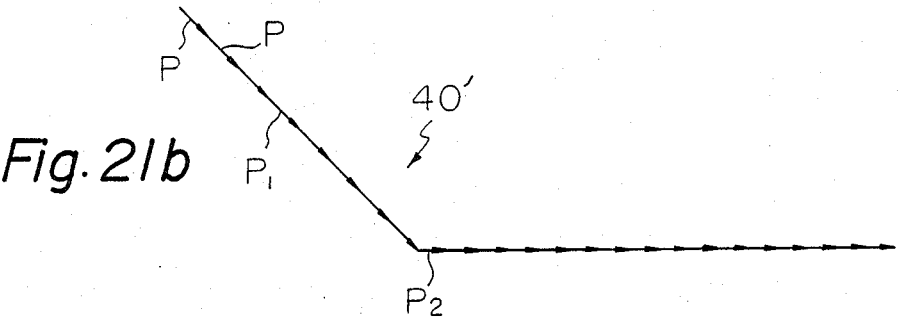

The procedure discussed above is objectionable, however, in that different direction codes are distributed in zig-zag fashion at every other or more picture elements as seen in FIG. 9. FIG. 10a illustrates a string of direction codes constructed by picking up the direction codes assigned to the boundary picture elements in the uppermost rows out of all the boundary picture elements of the character pattern 30a shown in FIG. 9, and then arranging them successively. The primary direction 20, 22, 24 or 26 shown in FIG. 2 is determined for each of the direction codes in the string, the primary directions are transformed into unit vectors in the corresponding direction, and then the start points and end points of the successive unit vectors are connected together, thereby obtaining the vector train 40 indicated in FIG. 10b. It will be seen that the vector train 40 shown in FIG. 10b is approximate to the character pattern 30a indicated in FIG. 7. It will be recalled that the character pattern 30a illustrated in FIG. 7 is part 30 of the alphabet Q shown in FIG. 8. Bearing this in mind, the character part 30 can be transformed into a vector train as shown in FIG. 21b after converting them directly into the primary directions 20, 22, 24 and 26. As the comparison between the vector trains 40 and 40' of FIGS. 10b and 21b teaches, the character pattern with the direction codes assigned by the prior art method does not sufficiently reflect the original character pattern. This is because the character pattern is greatly affected by the errors due to the quantization which is carried out for recognizing a character pattern in terms of picture elements. The character pattern 30a shown in FIG. 7 should originally be the character pattern shown in FIG. 8 in which a slanted line connects to a substantially horizontal line. This teaches that a common direction code should be assigned continuously to each of the opposite portions of the bend between the slanted and horizontal lines.

Referring now to FIGS. 11 to 21a and 21b, the new and improved direction code assigning method of the present invention will be described in detail.

Figure 11:
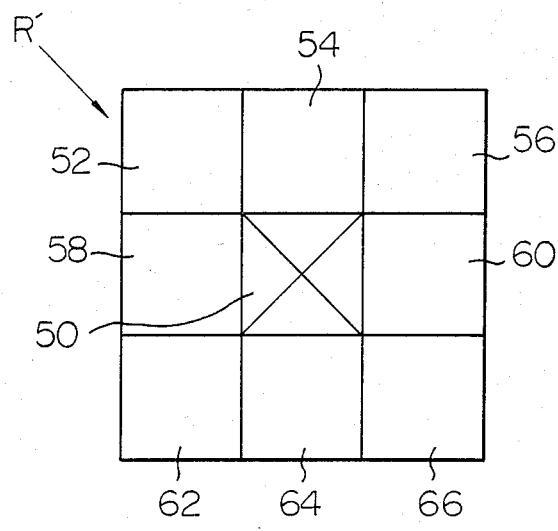
FIG. 11 is a view similar to FIG. 1 but showing a direction code assigning method embodying the present invention.

Referring to FIG. 11, a discrimination region designated R' is shown which is applied to the method of the present invention. The discrimination region R' consists of a boundary picture element 50 and its neighboring picture elements 52, 54, 56, 58, 60, 62, 64 and 66. The discrimination region R' is a "3×3" matrix of picture elements which includes the picture elements 52, 56, 62 and 68 obliquely neighboring the boundary picture element 50, in addition to the picture elements 58, 60, 54 and 64 neighboring the same in the vertical and horizontal directions.

Figure 12:
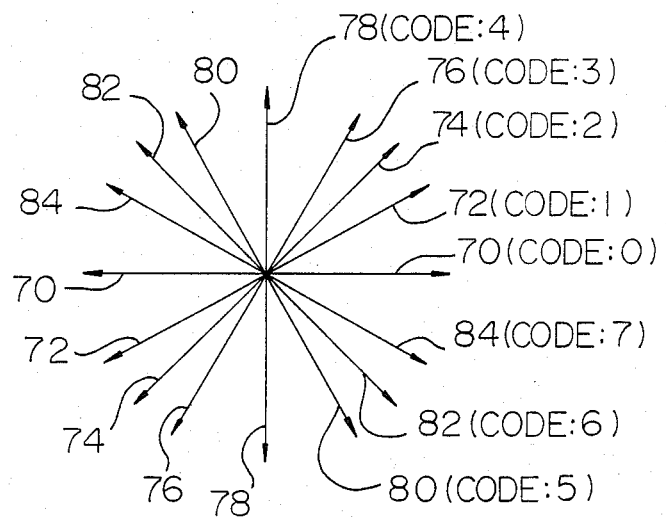
FIG. 12 is a diagram showing directions to which direction codes correspond in accordance with the present invention.
Figure 13A:
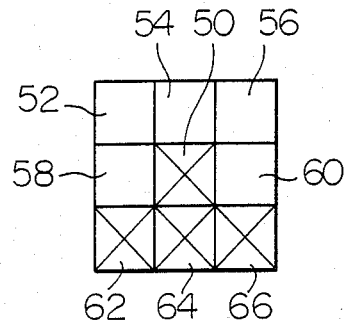
Figure 13B:
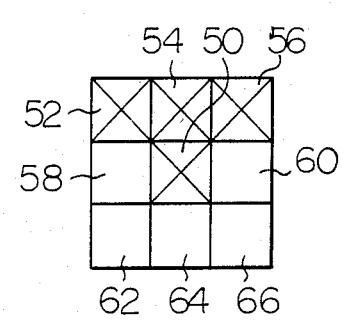
Figure 13C:
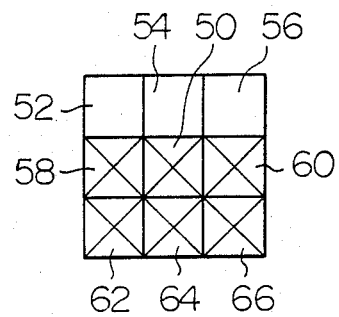
Figure 13D:
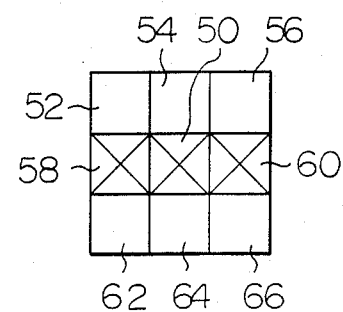
Figure 13E:
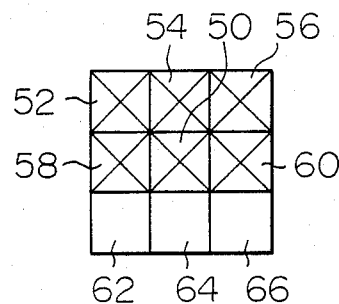
Figure 13F:
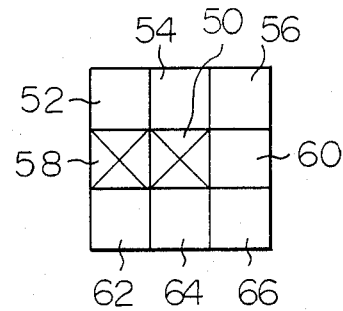
Figure 14C:
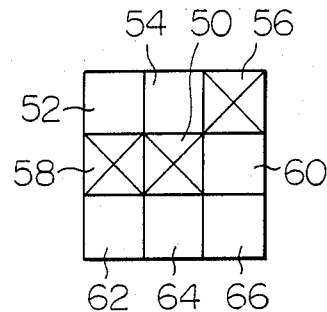
Figure 14D:
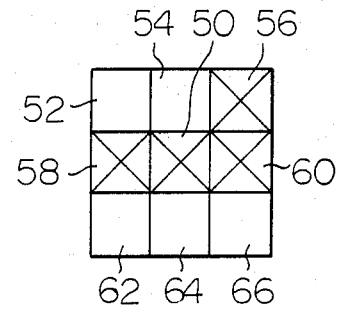
Figure 14E:
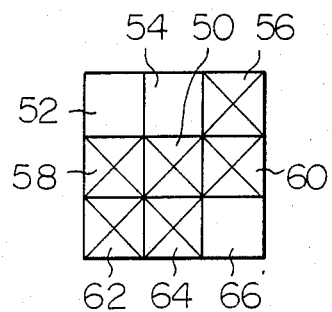
Figure 14F:
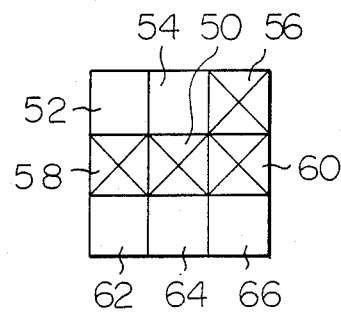
Figure 14G:
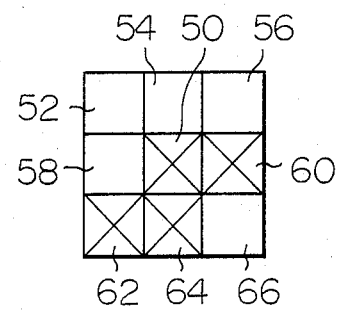
Figure 14H:
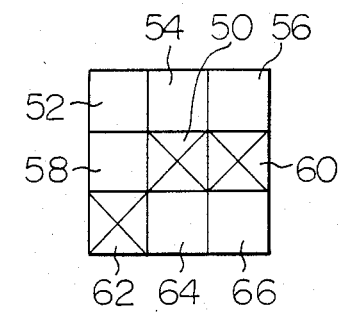
Figure 14I:
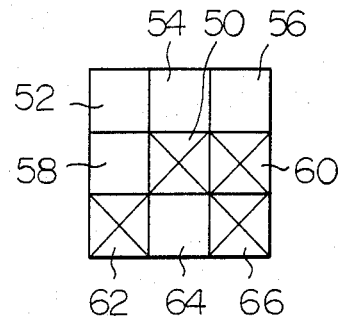
Figure 14J:
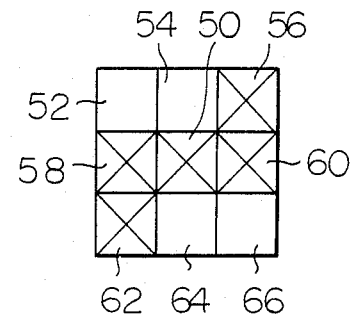
Figure 14K:
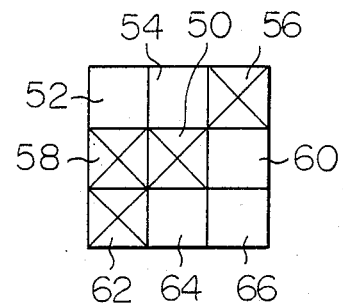

The connectivity of the boundary picture element 50 is considered in terms of eight directions 70, 72, 74, 76, 78, 80, 82 and 84 as shown in FIG. 12. Of these directions, the directions 70, 74, 78 and 82 correspond to the primary directions 22, 24, 20 and 26 shown in FIG. 2, respectively. The other directions 72, 76, 80 and 84 individually neighbor the primary directions 70, 74, 78 and 82 and will be referred to as "secondary directions" hereafter. Direction code "0" is allotted to the primary direction 70, direction code "1" to the secondary direction 72, direction code "2" to the primary direction 74, direction code "3" to the secondary direction 76, direction code "4" to the primary direction 78, direction code "5" to the secondary direction 80, direction code "6" to the primary direction 82 and direction code "7" to the secondary direction 84.

The discrimination region R' and direction codes "0" to "7" of the directions 70-84 are correlated as will be described. When the character pattern in the discrimination region R' corresponds to any one of the character patterns indicated in FIGS. 13a-13i, the boundary picture element 50 is determined as belonging to the stroke in the primary direction 70 and assigned with direction code "0". When the character pattern in the same region R' corresponds to any one of the character patterns shown in FIGS. 14a-14k and their 180° rotated versions, the boundary picture element 50 is considered to belong to the stroke in the secondary direction 72 and provided with direction code "1". When the character pattern in the same region R' is the match of the character pattern shown in FIG. 15a, for example, the boundary picture element 50 is assigned with the direction code "2". In the same manner, the boundary picture element 50 in the same region R' is assigned with one of the other direction codes "3" to "7" when the character pattern corresponds to any one of the character patterns indicated in FIGS. 15b-15f, for example. It will be noted that, besides the character patterns shown in FIGS. 15a-15f, some other character patterns may correspond to the direction codes "2" to "7". Thus, the correlationship between a character pattern and a direction code depends on the direction of stroke to which the character pattern belongs, as shown in FIGS. 13a-15f. Some principles exist in the correlationship between the character patterns and the direction codes. One of them is that rotating 90° the character pattern with direction code "0" shown in FIG. 13d brings it into coincidence with the character pattern corresponding to direction code "4" which is provided by rotating the primary direction 70 of the direction code "0" through 90°, i.e. the character pattern indicated in FIG. 15c. Similar correlationship applies to the character pattern of direction code "1" shown in FIG. 14a, the character pattern of direction code "3" shown in FIG. 15b, the character pattern of direction code "5" shown in FIG. 15d and the character pattern of direction code "7" shown in FIG. 15f.

Employing the character pattern 30a shown in FIG. 7, the correspondence between character patterns and direction codes described above is applied to assign direction codes to the respective boundary picture elements as follows.

Figure 15A:
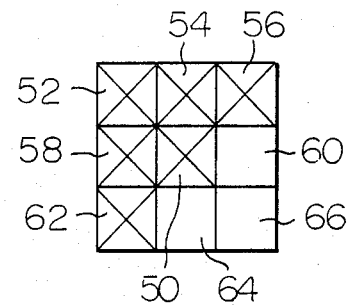
FIGS. 15a–15f are diagrams showing exemplary character patterns corresponding to direction codes "2" to "7" shown in FIG. 12.
Figure 15B:
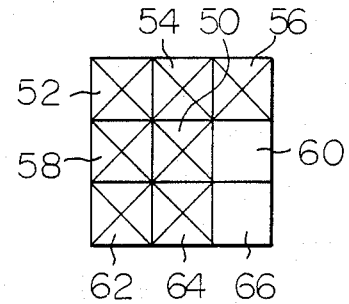
Figure 15C:
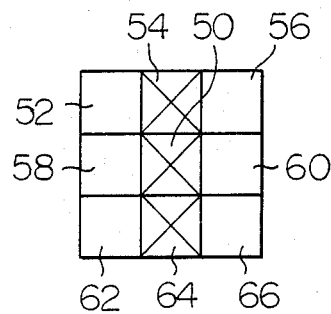
Figure 15D:
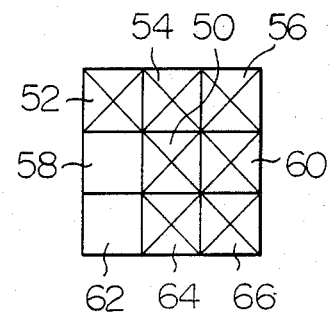
Figure 15E:
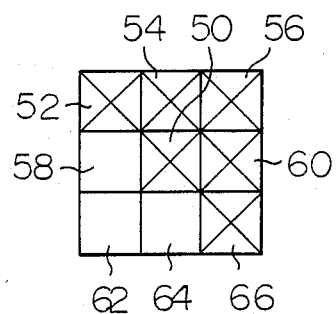
Figure 15F:
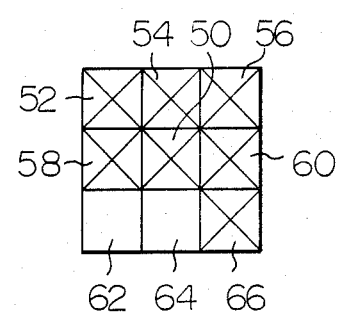
Figure 16:
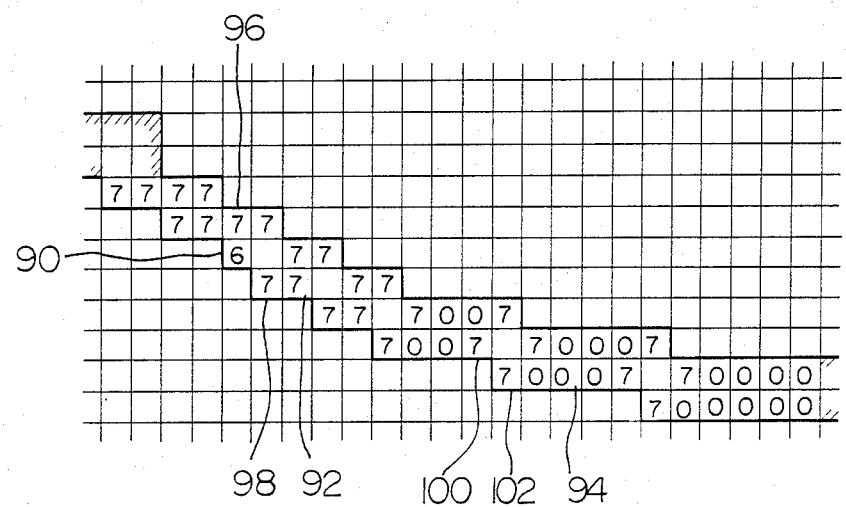
FIG. 16 is a diagram showing direction codes assigned to respective boundary picture elements by the method of the invention, the character pattern being the same as that of FIG. 7.
Figure 17:
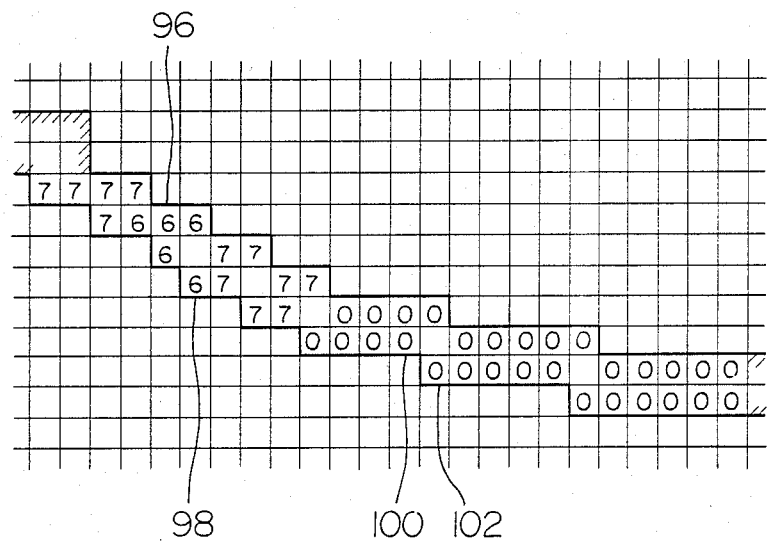
FIG. 17 is a diagram representing the result of an integration performed on the direction codes of FIG. 16.

Referring to FIG. 16, the character pattern in the discrimination region R' with a black picture element 90 corresponds to the character pattern indicated in FIG. 15e. Hence, the black picture element 90 is assigned with direction code "6". The character pattern in the discrimination region R' with a black picture element 92 corresponds to the character pattern shown in FIG. 15f, so that the picture element 92 is provided with direction code "7" as shown in FIG. 16. Further, the character pattern in the discrimination region R' with a black picture element 94 is the match of the character pattern shown in FIG. 13e and, accordingly, the picture element 94 is provided with direction code "0". The same rule is adopted to assign direction codes to the respective boundary picture element which constitute the character pattern 30a.

Thereafter, of all the boundary picture elements assigned with direction codes "1", "3", "5" and "7" corresponding to the secondary directions 72, 76, 80 and 84, those neighboring the boundary picture elements provided with direction codes "0", "2", "4" and "6" corresponding to the primary directions 70, 74, 78 and 82 are selected. In the example shown in FIG. 16, black picture elements 96, 98, 100, 102 and the like are the such picture elements.

Figure 18:
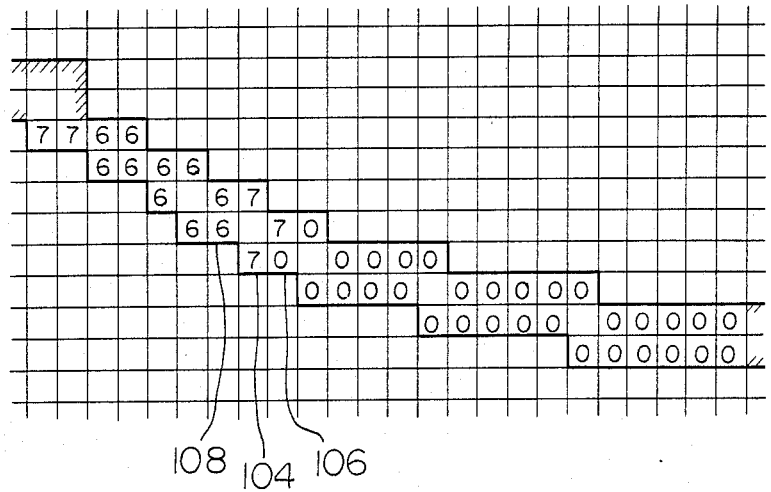
FIG. 18 is a diagram representing the result of an integration performed on the direction codes of FIG. 17.
Figure 19:
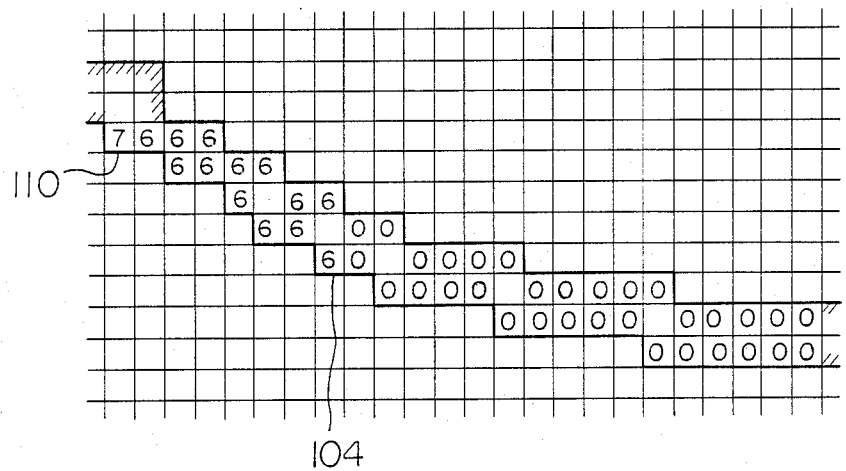
FIG. 19 is a diagram representing the result of an integration performed on the direction codes of FIG. 18.
Figure 20:
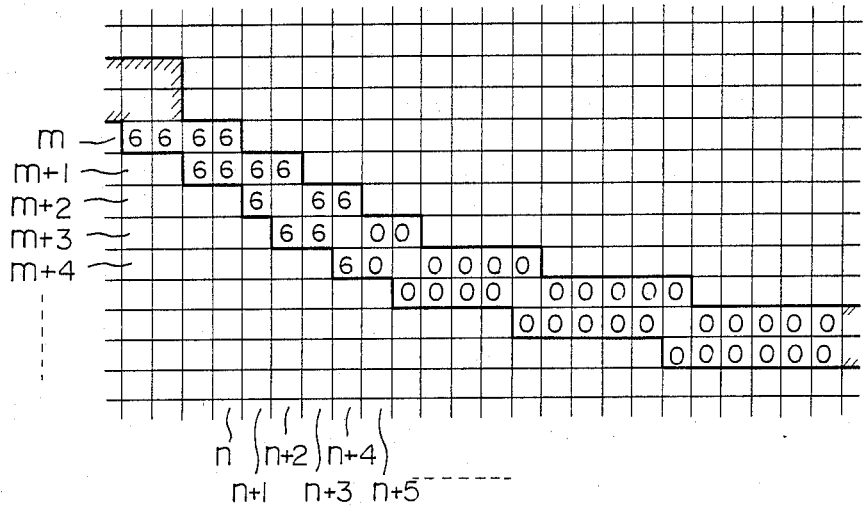
FIG. 20 is a diagram showing the result of an integration performed on the direction codes of FIG. 19.

The specific picture elements thus selected are subjected to "unification" which will be described and is entirely new to the art. The unification is to convert the direction codes assigned to the selected boundary picture elements into the direction codes which correspond to the primary directions of their adjacent boundary picture elements. For example, direction code "7" of the black picture elements 96 and 98 in FIG. 16 is changed to the direction code "6" provided to the black picture element 90. Likewise, direction code "7" of black picture elements 100 and 102 is changed to the direction code "0". By the unification, the direction codes shown in FIG. 16 are transformed into the direction codes shown in FIG. 17. Comparing FIGS. 17 and 9, it will be clear that such a process for unification provides continuity to the direction codes which settles the problem inherent in the prior art method. Unifying the direction codes shown in FIG. 17 sets up the direction codes shown in FIG. 18 and, then, unifying the direction codes shown in FIG. 18 sets up the direction codes shown in FIG. 19. In this instance, whereas a black picture element 104 indicated in FIG. 18 is assigned with direction code "7" corresponding to the secondary direction 84, black picture elements 106 and 108 assigned with direction codes "0" and "6" corresponding to the primary directions 70 and 82, respectively, neighbor the black picture element 104. Nevertheless, no particular condition is imposed as to which one of the direction codes "0" and "6" should be employed for the direction code "7" of the black picture element 104 concerned. Thus, the direction code "7" is unified to either the direction code "0" or the direction code "6", the latter in the example shown in FIG. 19. The error due to such arbitrary choice is only negligible in the extraction of the stroke. Stated another way, the original character pattern shown in FIG. 8 is a smooth curve and, as long as the curve is recognized by quantization with respect to the four primary directions 70, 74, 78 and 82, a substantial error will likely develop in the bent portion of the curve. This has of course been taken into consideration as a premise. Accordingly, the error due to the arbitrary choice mentioned is too small to affect the character recognition, compared to the error attributable to the quantization of directions. Further unifying the direction codes shown in FIG. 19 provides the direction codes shown in FIG. 20. The unification from FIG. 19 to FIG. 20 is performed solely on the direction code "7" of a black picture element 110 shown in FIG. 19. The unification is completed in this way and all the secondary direction codes "7" are changed to "0" or "6".

Now, the direction codes indicated in FIG. 20 will be evaluated using the same method as described with reference to FIG. 9. In view of the fact that all the picture elements shown in FIG. 20 can be specified by designating their rows and columns, the direction codes of the uppermost boundary picture elements in the respective columns are picked up and arranged sequentially as shown in FIG. 21a. In the "n" column, for example, direction code "6" has been assigned to the picture elements in the "m" row and "m+1" row, so that in the "n" column the direction code "6" in the uppermost or "m" row picture element is picked up and arranged as shown in FIG. 21a. In the "n+5" column, direction code "0" is assigned to the picture elements in the "m+3" and "m+4" rows and, accordingly, direction code "0" in the uppermost or "m+3" picture element is picked up and arranged sequentially. Such a procedure is carried out for each of the columns. Then, the directions 70, 74, 78 and 82 shown in FIG. 12 are determined in accordance with the string of direction codes shown in FIG. 21a, the directions are transformed into unit vectors P in the corresponding directions, and then the start and end points of the successive unit vectors P are connected together. For example, the picture element (n, m) in the "n" row, "m" column of FIG. 20 corresponds to the unit vector $P_1$ indicated in FIG. 21b while the picture element (n+5, m+3) corresponds to the unit vector $P_2$. Comparing the vector pattern shown in FIG. 21b with the character pattern shown in FIG. 8 will prove that the vector train is quite faithful to the original character pattern except for some error due to the quantization of directions and, thus, freed from the drawback which has been discussed in conjunction with FIG. 10b.

In summary, it will be seen that the present invention applied to the preprocessing for the extraction of strokes facilitates desirable extraction of strokes, while minimizing the influence of quantization necessary for the recognition of character patterns on a picture element basis.

While the "black picture elements" and "white picture elements" have been used assuming a case wherein characters are carried on white background, the former should be understood to be the picture elements occupied by character information and the latter the rest of the entire picture elements. Stated another way, the "black" and "white" do not have to coincide with the actual colors of character information; the "white" and "black" will be reversed in the description when white characters are carried on black background.

Furthermore, the four secondary directions employed in the embodiment may be replaced by more directions and the discrimination region may be made wider. Then, the unification will be carried out toward the adjacent primary or secondary direction to convert the direction code successively to the primary direction. When more than four primary directions are required for the extraction of strokes, secondary directions should only be employed as in the embodiment shown and described.

Various modifications will become possible for those skilled in the art after receiving the teachings of the present disclosure without departing from the scope thereof. For example, the directions of connectivity of boundary picture elements may be determined by logic operation, as by performing differentiation for each of two different directions to obtain a ratio between the resulting values. The processings described may be programmed or carried out with exclusive hardware or firmware. For high speed operations, it will be advantageous to employ firmware installed in a read only memory or ROM to assign direction codes to boundary picture elements, and a logic operation circuit for the unification. In any case, an apparatus for practicing such processings can be realized with ease by the techniques well known to the art.

What is claimed is:

1. In a character recognition system, a machine method of discriminating the directions of connectivity of boundary picture elements, which form part of a two-level image together with other picture elements, with respect to a plurality of primary directions and assigning to each of the boundary picture elements a direction code corresponding to the discriminated direction of connectivity, comprising the steps of:
   (a) discriminating the direction of connectivity of each boundary picture element with respect to the primary directions and a plurality of secondary directions which individually neighbor the primary directions;

(b) assigning to the respective boundary picture elements direction codes which correspond to the discriminated directions of connectivity thereof;

(c) selecting boundary picture elements adjacent to boundary picture elements provided with direction codes which correspond to the primary directions, out of all the boundary picture elements which are assigned with direction codes corresponding to the secondary directions; and (d) converting the direction codes assigned to said selected boundary picture elements into the direction codes of the adjacent boundary picture elements corresponding to the primary directions.

2. A method as claimed in claim 1, in which the number of the secondary directions is equal to the number of the primary directions.

3. A method as claimed in claim 1, in which the direction of connectivity is discriminated in step (a) with respect to a "3×3" picture element matrix having a boundary picture element at the center.

4. A method as claimed in claim 1, in which steps (c) and (d) are repeated a plurality of times.

5. A method as claimed in claim 1, in which steps (c) and (d) are repeated until all the direction codes corresponding to the secondary directions become converted into the direction codes corresponding to the primary directions.

* * * * *